United States Patent

Barnett

[11] 3,854,173
[45] Dec. 17, 1974

[54] TURNBUCKLE RETAINER

[76] Inventor: Barry Roger Michael Barnett, 41 Blackthorn Ave., West Drayton, England

[22] Filed: Feb. 12, 1973

[21] Appl. No.: 331,455

[30] Foreign Application Priority Data
Feb. 18, 1972 Great Britain .................... 7665/72

[52] U.S. Cl. ............................ 24/221 R, 24/221 K
[51] Int. Cl. ............................................ A44b 17/00
[58] Field of Search .......... 24/221 R, 73 RM, 221 A, 24/221 K; 16/2; 248/56

[56] References Cited
UNITED STATES PATENTS

| | | | |
|---|---|---|---|
| 3,060,538 | 10/1962 | Simi | 24/221 R |
| 3,244,802 | 4/1966 | Sturtevant et al. | 16/2 |
| 3,366,356 | 1/1968 | Fisher | 16/2 |
| 3,407,454 | 10/1968 | Myatt | 24/221 R |
| 3,486,205 | 12/1969 | Smith | 24/221 R |

Primary Examiner—Paul R. Gilliam
Assistant Examiner—Darrell Marquette
Attorney, Agent, or Firm—James R. O'Conner

[57] ABSTRACT

A bush for use with a turnbuckle to secure two apertured panels together. The bush comprises a shank which is preferably formed by two generally parallel legs and which is adapted to extend through the aperture in one of the panels and a head adapted to abut one surface of the said one panel. Retention means are provided on the shank to hold the bush in position in the said one panel and a bore is formed through the head and the shank to receive the turnbuckle which is used to clamp the other panel against the head of the bush. The bore is elongate in transverse section so that locking lugs on the turnbuckle can pass through the bush and then be rotated through 90° to lock across the end of the shank. The head of the bush is resiliently compressible towards the shank to allow for tolerance in the length of the turnbuckle and create a rattle free connection of the panels.

4 Claims, 8 Drawing Figures

TURNBUCKLE RETAINER

BACKGROUND TO THE INVENTION

The present invention relates to an improved bush for a turnbuckle.

It is known to provide a bush for retaining a turnbuckle in which the bush comprises a head and a shank in the form of a pair of legs which extend outwardly from the head and which are passed through an aperture in a support. The turnbuckle is then passed through the head and between the legs of the bush and is rotated through 90° to lock the turnbuckle on the bush. In order to provide for tolerance in the length of the turnbuckle, the legs of the bush are resilient so that they can be compressed towards the head of the bush.

This type of bush can present problems, for instance because the legs of the bush cannot be compressed until the lugs on the turnbuckle have been at least partially rotated and in some instances it can be advantageous for the shank of the bush to be substantially rigid and non compressible.

It is therefore an object of the present invention to provide a bush for a turnbuckle having a shank comprising legs which are substantially rigid in an axial sense and in which tolerance in the length of the turnbuckle is taken up by resilience in the head of the bush.

STATEMENT OF THE INVENTION

In one form of the present invention there is provided a bush for use with a turnbuckle to secure two apertured panels together, the bush comprising a shank adapted to extend through the aperture in one of the panels so as to be non-rotatable therein, a head integral with the shank and adapted to abut one surface of the said one panel, retaining means on the shank adapted to engage the other surface of the said one panel to retain the bush in the aperture, and a bore, which is elongate in transverse section, extending through the head and through the length of the shank whereby a turnbuckle having transversely extending locking lugs at its leading end can be passed through the head and into the shank and rotated through 90° to engage the locking lugs across the end of the shank, wherein the head of the bush is substantially resilient in the direction of the length of the shank so as to be compressible in a direction towards the shank to accommodate a substantial tolerance in the length of the turnbuckle.

DESCRIPTION OF THE PREFERRED EMBODIMENT

Figure 1:
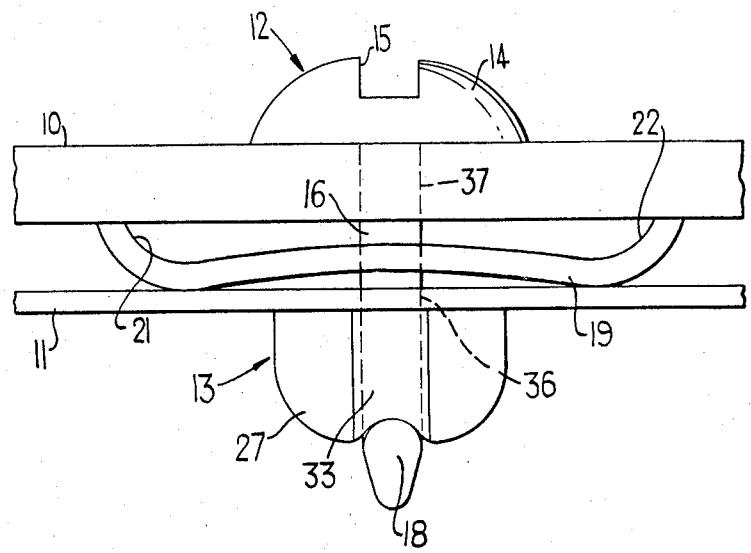
FIG. 1 is an elevation of two apertured panels secured together with the aid of a turnbuckle and a bush according to the present invention.
Figure 2:
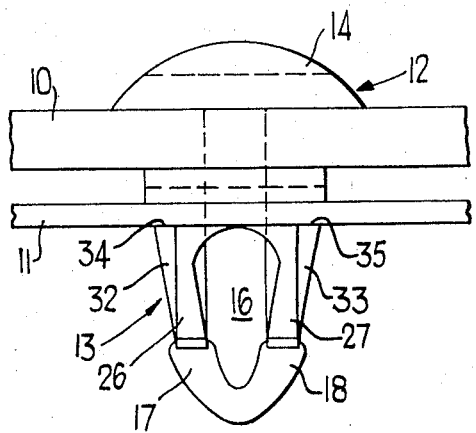
FIG. 2 is a side elevation of the assembly shown in FIG. 1.
Figure 3:
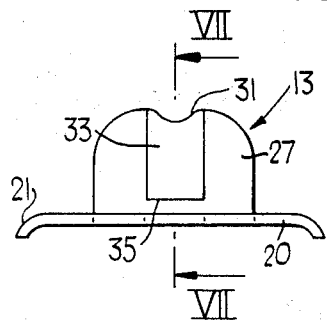
FIG. 3 is an elevation of the bush shown in FIG. 1.
Figure 6:
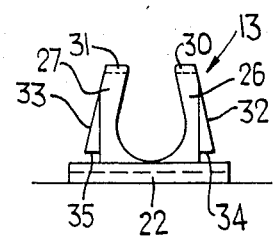
FIG. 6 is a side elevation of the bush shown in FIG. 3.
Figure 4:
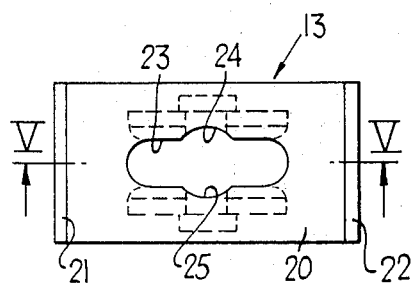
FIG. 4 is an underplan of FIG. 3.
Figure 7:
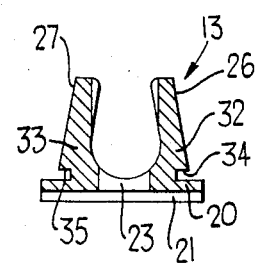
FIG. 7 is a section taken on the line VII—VII of FIG. 3.
Figure 5:
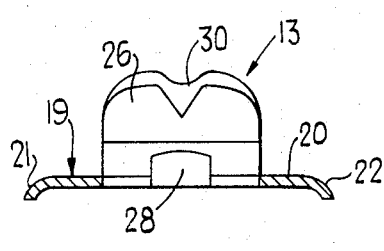
FIG. 5 is a section taken on the line V—V of FIG. 4.
Figure 8:
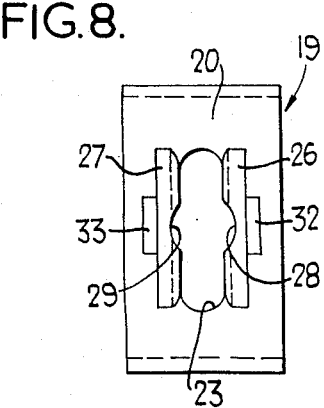
FIG. 8 is a plan view of the bush shown in FIG. 3.

In the drawings, a panel 10 is shown removably attached to a support panel 11 by a turnbuckle 12 and a bush 13. The turnbuckle 12 comprises a head 14 formed with a slot 15, a cylindrical shank 16 and a pair of oppositely and outwardly directed lugs 17 and 18 at the tip of the shank 16.

The turnbuckle is used with the bush 13, which is shown in detail in FIGS. 3 to 8.

The bush 13 is preferably formed from a synthetic plastics material such as an acetal resin and comprises a head 19 having a substantially flat base portion 20 and two curved end portions 21 and 22 on opposite sides of the flat base portion 20. The end portions 21 and 22 of the bush can be curved as shown or inclined to the base portion 20.

The head 19 is also formed with an elongate aperture 23 having arcuate facing recesses 24 and 25 in its longer sides. The size and shape of the aperture 23 is such that the lugs and shank in the turnbuckle are a clearance fit therethrough.

Projecting from the side of the head 19 opposite to the end portion 21 and 22 the bush is also formed with an integral shank comprising two legs 26 and 27 which are spaced apart and located one on each side of the aperture 23 so as to define with the aperture 23, a bore extending through the head and the shank of the bush. The inside face of each leg is formed with a part cylindrical groove 28 and 29 respectively and the end face of each leg 26 and 27 is formed with an arcuate recess 30 and 31 respectively.

The outer face of each leg 26 and 27 is formed with retaining means in the form of an axially extending rib 32 and 33 respectively, each rib 32 and 33 having an abutment surface 34 and 35 respectively which faces the head 19.

In order to attach the panels 10 and 11 together, the bush 13 is first attached in a rectangular aperture 36 formed in the panel 11 by passing the legs 26 and 27 through the aperture 36 until the rim of the aperture is trapped between the head 19 and the abutment surfaces 34 and 35 on the legs 26 and 27. As the legs enter the aperture 36 they are cammed inwardly by the ribs 32 and 33 and then snap outwardly as the panel locates between the abutment surfaces 34 and 35 and the head 19.

When the bush 13 is mounted in the panel 11, the turnbuckle 12 is passed through an aperture 37 formed in the panel 10 which is similar in shape to the aperture 23 in the bush 13. The panel 10 and the turnbuckle 12 are then brought up to the panel 11 and the leading end of the shank 16 of the turnbuckle 12 is passed through the aperture 23 in the bush and between the legs 26 and 27 until the lugs 17 and 18 are opposite the free ends of the legs 26 and 27. The turnbuckle 12 and panel 10 are then pressed firmly towards the panel 11 so as to flatten the head 19 of the bush until the lugs 17 and 18 are located level with or beyond the free ends of the legs 26 and 27 of the bush. The turnbuckle is then rotated through 90° until the lugs are aligned across the recesses 30 and 31 in the free ends of the legs 26 and 27. Axial downward pressure on the turnbuckle 12 is then released and the resilience in the head 19 forces the panels 10 and 11 apart slightly so as to place the assembly under tension and ensure a vibration and rattle free connection between the panels 10 and 11.

It has been found that the clamping pressure applied to the head 19 causes a bowing of the base portion 20, which is shown in FIG. 1. The end portions may also flatten out slightly under the clamping pressure.

The structure of the head 19 of the bush 13 can be varied provided that it is resiliently compressible so as to allow for a tolerance in the length of the turnbuckle and provide the necessary expansion pressure between the panels to ensure a rattle free connection. For instance, the curved end portions of the head can be joined by a substantially flat web which is spaced from the base portion but resiliently compressible towards the base portion when the end portions are bowed or flattened.

The structure of the shank of the bush can also be varied, for instance it can be substantially tubular in shape with a bore extending therethrough from end to end having the same cross-sectional shape as the aperture 23 in the head 19.

Further minor modifications can be made to the above described embodiment without departing from the spirit and scope of the invention which is best described in the following claims.

What I claim is:

1. A fastener combination for securing two apertured panels together comprising a turnbuckle and a bush, the turnbuckle including a head and a shank extending integrally from the head and having transversely extending locking lugs at its leading end, the bush including a shank adapted to extend through the aperture in one of the panels so as to be nonrotatable therein, a head integral with the shank and adapted to abut one surface of said one panel, retaining means on the shank adapted to engage the other surface of said one panel to retain the bush in the aperture, and an elongate bore extending through the head and through the length of the shank whereby the turnbuckle shank can be passed through the head of the bush and into the shank of the bush and rotated through 90° to engage the locking lugs across the end of the shank of the bush, the head of the bush being substantially resilient at a position remote from the shank of the bush and in the direction of the length of said shank so as to be compressible in a direction towards the shank to accommodate a substantial tolerance in the length of the turnbuckle shank.

2. A fastener combination according to claim 1 wherein the shank of the bush comprises two laterally spaced legs having facing surfaces defining the opposite sides of the bore through said shank.

3. A fastener combination according to claim 1 wherein the head of the bush includes a substantially flat base portion and curved end portions extending away from the shank of the bush, the curved end portions being adapted to flatten under pressure.

4. A fastener combination according to claim 2 wherein each leg of the shank of the bush has an end face formed with a recess adapted to receive a locking lug on the turnbuckle and a ramp face leading to the recess.

* * * * *